Figure 1:
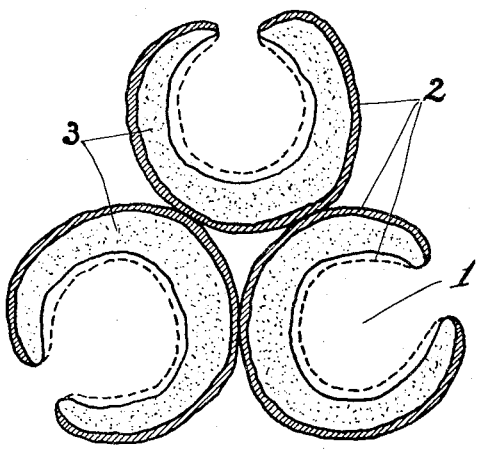

Dec. 26, 1933.   K. HIBI   1,941,172
METHOD FOR MANUFACTURING CALCIUM CYANAMIDE
Filed Sept. 21, 1931

INVENTOR.
Kastuharu Hibi
BY
ATTORNEYS.

Patented Dec. 26, 1933

1,941,172

UNITED STATES PATENT OFFICE 1,941,172

METHOD FOR MANUFACTURING CALCIUM CYANAMIDE

Katsuharu Hibi, Tokyo, Japan

Application September 21, 1931
Serial No. 564,239

15 Claims. (Cl. 23—78)

My invention aims to provide an improved method and apparatus for manufacturing calcium cyanamide and an improved form of product.

More particularly, my invention relates to producing small hollow beads of calcium carbide having conductive surfaces composed substantially of carbon, and subjecting these beads at a proper reaction temperature to the action of nitrogen so as to produce calcium cyanamide.

An object of my invention is to provide calcium carbide in a form which may be heated and kept at the proper reaction temperature by any suitable means, as by external heating, or preferably by passing an electric current through the mass while it is being subjected to the action of nitrogen, and thus to eliminate the necessity of external heating means heretofore required.

In the manufacture of calcium cyanamide, it has heretofore been considered essential to use finely powdered calcium carbide. An object of my invention is to produce a granular or hollow form of calcium carbide particle and thereby eliminate this troublesome and uneconomical procedure of crushing and grinding solid calcium carbide to a fine powder before reacting the same with nitrogen.

A further disadvantage of prior processes is that a massive, hard block of calcium cyanamide is produced which must be crushed and ground for commercial purposes. My process produces calcium cyanamide in the form of a spongy or porous mass which may be easily broken up into granules.

Further objects and results of my invention will be apparent from the following description and the accompanying drawing wherein I have shown one embodiment of my invention for purposes of illustration.

Figure 2:
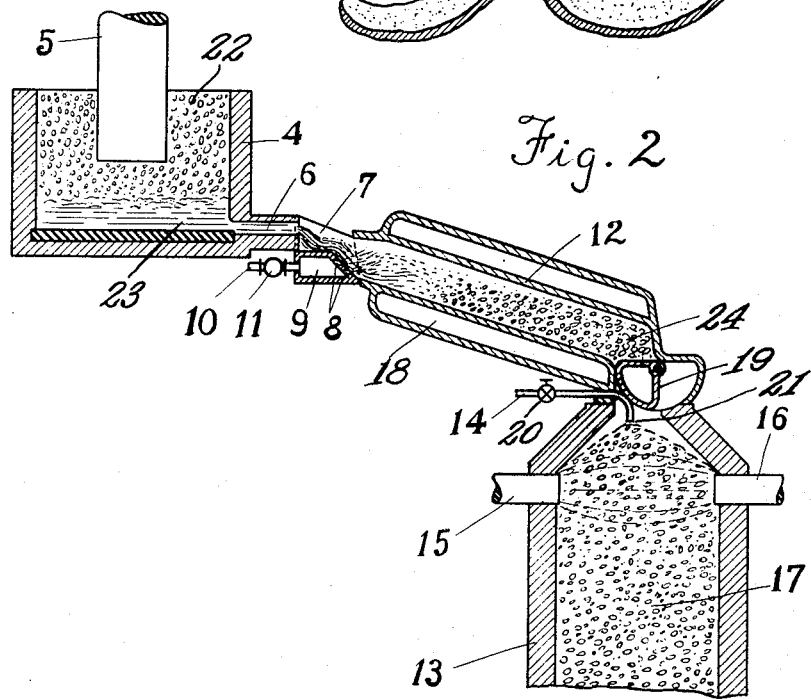

In the drawing,

Fig. 1 shows an enlarged sectional view of the calcium carbide beads produced at an intermediate stage of the process; and Fig. 2 shows a central vertical section of an apparatus for continuously producing calcium cyanamide from raw materials.

Referring to Fig. 2, an electric furnace 4 is provided with electrodes 5 and bottom outlet 6. Below the outlet 6 is positioned a sloping guide wall 7 made of a refractory material, such as firebrick, and penetrated by a suitable number of nozzles 8, directed outwardly. Behind the guide wall and nozzles is a closed nozzle chamber 9 to which is connected a pressure gas pipe 10 having a valve 11.

Arranged in front of the wall 7 is a downwardly sloping container 12 which may be provided with a cooling jacket 18. The lower end of container 12 is open, but the size of the opening may be regulated at will by means of an adjustable gate 19 or valve of suitable type.

Directly below the lower end of the container 12 is a reaction chamber 13 into the upper end of which nitrogen may be supplied by means of pipe 14 having a valve 20 and downwardly directed nozzle or outlet 21.

The upper wall of the reaction chamber 13 is penetrated by oppositely positioned electrodes 15 and 16, connected to a convenient source of electric energy.

The mode of operation is as follows:

A mixture 22 of coke and lime in proper proportions to form calcium carbide is fed into furnace 4 and brought to proper reaction temperature by an electric current supplied through electrodes 5. Molten calcium carbide 23 collects in the bottom of the furnace and flows out through outlet 6.

The molten material flows in a stream along the guide wall 7 and past nozzles 8 therein. Gas under high pressure is fed into nozzle chamber 9 by means of pipe 10, the pressure being controlled by valve 11, and issues from the nozzles in the form of fine, high velocity jets. This gas may be of any kind so long as it will not react with the calcium carbide to the detriment of the process. I prefer to employ nitrogen because any reaction which occurs will produce calcium cyanamide which is the desired end product. The molten calcium carbide stream is blown out by the jets into the form of small hollowed out beads 24 of the general form shown in Fig. 1 and having diameters of about 1/16 to 1/8 of an inch.

This results from applying the mechanical force of the high-velocity jets to a divided molten mass of the carbide, the particles being thrown out at high speed and solidifying as hollow spherical beads. It is apparent that such special shape of the calcium carbide is due to the surface tension of the rapidly cooling viscous molten material.

After careful experiments, I have discovered that the calcium carbide beads thus prepared are good electrical conductors whether they be hot or cold. By investigations, I have found that the reason for this is that these beads possess a conductive coating or surface layer composed substantially of carbon, which is probably in the form of graphite.

Referring to Fig. 1, the beads are illustrated as having a hollowed out interior 1 and surface layers 2 of graphite enclosing the calcium carbide 3 therein. It will be apparent that a mass of such beads will conduct electricity and that a current of electricity passed through such a mass may be conveniently utilized for heating the mass uniformly throughout. This is not possible with a mass composed of ordinary calcium carbide particles owing to the fact that calcium carbide, especially when cold, has such a high electrical resistance as to be classed as an insulating material rather than a conducting material.

A catalyzer, such as calcium fluoride, calcium chloride, or the like, may be supplied to the jet-forming gas and the desirable result obtained that the calcium carbide will simultaneously have a catalytic agent incorporated therein while being formed into beads. This will greatly assist in the production of calcium cyanamide as hereafter described.

The beads 24 as formed are collected in the container 12 and may be cooled down as desired by means of the cooling jacket 18. Gate 19 is adjusted so that the beads will pass at the desired rate into reaction chamber 13.

When starting operations, the reaction chamber 13 is allowed to fill with the beads which will be cold or only warm. An electric current is passed through the mass between electrodes 15 and 16. The graphite coatings of the beads form paths for the current and yet possess sufficient resistance to result in the formation of heat. The heat will be uniformly distributed throughout the mass and may be controlled at will by varying the amount of current.

Ordinary cyanamide reaction chambers require resistance heating elements arranged along the wall, since the calcium carbide is not itself an electrical conductor. These heaters are easily damaged and furthermore heat up the mass slowly and non-uniformly. Electric arc heating requires a high voltage and is dangerous. These hinderances to successful operation are eliminated by my method.

When the beads have been heated up to reaction temperature, a stream of nitrogen gas is directed into the mass from pipe 14 and reacts with the calcium carbide beads to form calcium cyanamide. This process will be hastened if a catalytic agent has been incorporated into the beads as above described. The reaction heat which results serves to heat up the fresh calcium carbide beads which are supplied from container 12 as needed. Additional heat which may be required can be obtained by passing a current between electrodes 15 and 16, and by regulating this current the temperature of the reacting mass can be controlled and maintained at the desired point, which is preferably a little above the melting point of granular calcium cyanamide.

It will be apparent that the hollowed out beads which I employ cause the reacting mass to be quite porous and cause a large surface to be exposed to the nitrogen, and thus the reaction is greatly hastened and facilitated.

The reaction is carried on as a continuous operation, fresh beads being supplied at the top and calcium cyanamide 17 being withdrawn from the bottom of the reaction chamber.

A further advantage of my method is that the calicum cyanamide is produced in a very desirable form, consisting of a porous or spongy, loosely conglomerated, mass which can be easily separated to form granular cyanamide which, I believe, has never been obtained prior to my invention. Such granular calcium cyanamide has various advantages when it is used in the field as a fertilizer.

My invention obviously is not restricted to the particular embodiments thereof herein illustrated and described.

In the following claims, it will be understood that "carbon" is used generically and that by "calcium carbide" is meant the commercial product which contains impurities, including carbon. By "non-reactive gas" is meant a gas which will not react with the calcium carbide to the detriment of the process. By "catalytic agent" is meant an agent for promoting the reaction between calcium carbide and nitrogen, such as calcium fluoride, calcium chloride, or the like; "conductive" means electrically conductive. By "semi-inter-fused" is meant inter-fused to the extent of sticking together but not to the extent of preventing mechanical separation.

What I claim as new and desire to secure by Letters Patent of the United States is:

1. The method of manufacturing calcium cyanamide, comprising forming beads of calcium carbide having conductive surface layers of carbon, collecting the same, raising the temperature as desired by passing an electric current through the mass and subjecting said beads to gaseous nitrogen at a reaction temperature.

2. The method of manufacturing granular calcium cyanamide, comprising forming hollowed out beads of calcium carbide having conductive surfaces of carbon, collecting the same, raising the temperature as desired by passing an electric current through the mass, and subjecting said beads to gaseous nitrogen at a reaction temperature.

3. The method of manufacturing granular calcium cyanamide, comprising forming beads of calcium carbide mixed with a catalytic agent and having surface layers of carbon, collecting the beads and passing an electric current through the mass thereby controlling the temperature as desired, and subjecting said beads to gaseous nitrogen at a reaction temperature.

4. A continuous process for manufacturing granular calcium cyanamide from basic materials, comprising heating a mixture of coke and lime to produce molten calcium carbide, replenishing the coke and lime as needed, passing a stream of the molten material in contact with high-velocity jets of non-reactive gas to produce hollowed out beads having conductive surface layers of carbon, collecting said beads, raising the temperature as desired by passing an electric current through the mass, treating with gaseous nitrogen at a reaction temperature near the melting point of calcium cyanamide, and drawing off the resulting granular calcium cyanamide as formed.

5. The method specified in claim 4 wherein the beads have a catalytic agent embodied therein, especially in the surfaces, as a result of introducing said agent into the bead forming gas.

6. The method of forming beads of calcium carbide having conductive surfaces of carbon, comprising directing high-velocity jets of non-reactive gas through molten calcium carbide.

7. The method of forming hollowed out beads of calcium carbide having conductive surfaces substantially composed of carbon, comprising passing molten calcium carbide over high-velocity jets of non-reactive gas.

8. The method of forming hollowed out beads of calcium carbide having conductive surfaces substantially composed of carbon, comprising passing a thin stream of molten calcium carbide past high-velocity jets of non-reactive gas.

9. The method of forming calcium carbide beads of the character described and having a catalytic agent embodied therein, comprising passing molten calcium carbide over high-velocity jets of non-reactive gas containing said agent.

10. The method of forming calcium carbide beads of the character described and having a catalytic agent embodied therein, especially in the surfaces, comprising passing a thin stream of molten calcium carbide past high-velocity jets of non-reactive gas containing said agent.

11. As a new product, a calcium carbide bead having a conductive surface substantially composed of carbon.

12. As a new product, a hollowed out calcium carbide bead having conductive surfaces integral therewith comprising carbon.

13. As a new product, calcium cyanamide in the form of a porous mass comprising semi-interfused hollowed out beads and fragments thereof.

14. As a new product, a hollowed out calcium cyanamide bead.

15. As a new product, granular calcium cyanamide of the form resulting from treating hollowed out beads of calcium carbide with nitrogen at a reaction temperature.

KATSUHARU HIBI.